Figure 1:
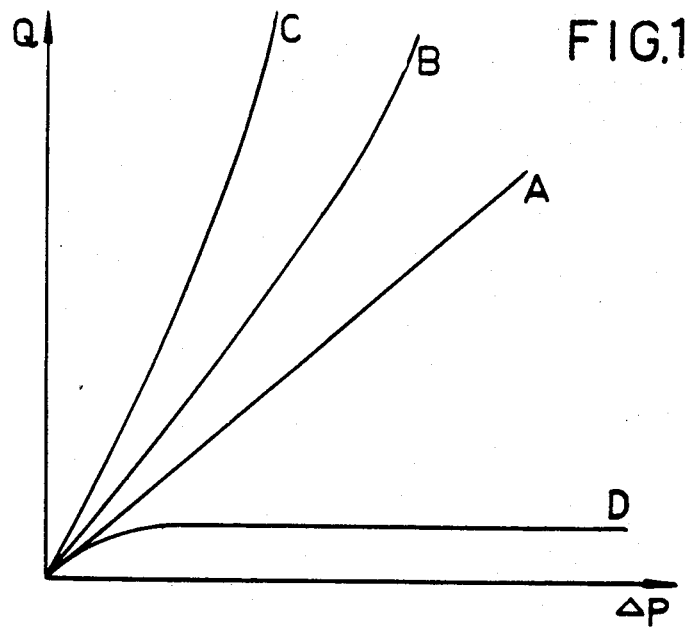

United States Patent [19]

Stenlund

[11] Patent Number: 4,504,069
[45] Date of Patent: Mar. 12, 1985

[54] SEALING DEVICE BETWEEN MOVABLE PARTS

[75] Inventor: Stig Stenlund, Saltsjöbaden, Sweden

[73] Assignee: Hep Products AB, Alvsjo, Sweden

[21] Appl. No.: 573,930

[22] PCT Filed: Apr. 22, 1983

[86] PCT No.: PCT/SE83/00157
    § 371 Date: Dec. 22, 1983
    § 102(e) Date: Dec. 22, 1983

[87] PCT Pub. No.: WO83/03881
    PCT Pub. Date: Nov. 10, 1983

[30] Foreign Application Priority Data
    Apr. 23, 1982 [SE] Sweden ................. 8202564

[51] Int. Cl.³ .................... F16J 15/38; F16K 41/00
[52] U.S. Cl. ........................... 277/174; 277/27; 277/53
[58] Field of Search ............... 277/173–177, 277/3, 27, 53

[56] References Cited

U.S. PATENT DOCUMENTS

| 3,001,806 | 9/1961 | Macks | 277/174 |
| 3,186,724 | 6/1965 | Wheatley | 277/174 |
| 3,348,849 | 10/1967 | Newcomd et al. | 277/174 |
| 3,377,073 | 4/1968 | Harney | 277/27 |
| 3,471,157 | 10/1969 | Swearingen | 277/174 |
| 3,606,350 | 9/1971 | Gravelle | 277/27 |
| 3,743,303 | 7/1973 | Pope | 277/27 |
| 4,114,902 | 9/1978 | Orlowski | 277/53 |
| 4,289,264 | 9/1981 | Rawlins | 277/173 |
| 4,337,951 | 7/1982 | Perego | 277/173 |

FOREIGN PATENT DOCUMENTS 1475588 4/1969 Fed. Rep. of Germany .

Primary Examiner—Robert I. Smith
Attorney, Agent, or Firm—Holman & Stern

[57] ABSTRACT

The sealing device is intended for sealing in one direction between the cooperating surface of a cylindric cavity and shell surface of a cylindric cavity and shell surface of a spindle (3) movable therein. One or the other surface is provided with an annular groove (9), in which a sealing ring (8) is located, which is slightly movable in axial and radial direction and intended to minimize fluidum leakage in axial direction between the cooperating surfaces. The ring (8) has small cross-sectional dimensions in relations to the spindle (3) and enclosing cavity. The ring is slim but is of rigid material. The sealing surface (12) of the ring is slightly conic. The ring abuts on the radial inner surface (11) of the groove along a supporting surface, which is annular and has substantially smaller height than the cross-sectional height of the ring and is located adjacent the sealing surface. One or more grooves are located in peripheral direction about the inner surface of the ring.

8 Claims, 13 Drawing Figures

SEALING DEVICE BETWEEN MOVABLE PARTS

This invention relates to a sealing device for sealing in one direction between the surface of a cylindric cavity and in co-operation therewith the shell surface of a spindle movable in the cavity, either of the surfaces provided with an annular groove, in which a sealing ring is laid, which can move slightly in axial and radial direction and is intended to minimize fluid leakage in axial direction between said co-operating surfaces, of which ring at its positioning in a groove in the cylindric cavity the sealing surface is located about the inside of the ring, and at its positioning in a groove in the spindle the sealing surface is located about the outside of the ring.

It was tried since long to solve the problems of leakage and slide friction in hydraulic valves comprising a valve housing and a slide axially movable therein. The efforts were directed to the co-operating sealing surfaces formed by the housing and slide and to designing said surfaces with tolerances so narrow as to form the smallest possible sealing gap. Too small clearance yields low leakage, but involves the risk of increased friction to such an extent that the slide is locked completely. Too great clearance yields unacceptable leakage, but reduced risk of slide locking. As the pressure increases the size of the gap and even can bend the valve housing and yields so-called hydraulic locking due to non-uniform pressure distribution in the sealing gap, both the leakage and the friction are affected in a negative way. The temperature and temperature deformation, too, have a negative effect on the leakage and friction. The leakage increases due to reduced viscosity and gap deformation, and the friction increases due to the bending of the valve housing and the shrinking of the gap, especially at high temperatures. The problems are overcome passibly well for small valves by a very exacting precision manufacture, where the slide as well as the slide aperture of the valve housing must be within ca. two thousandths of one millimeter. For large valves and at high tightness requirements the slide principle must be replaced by valve functions of seat type. Seat valves, however, have restricted controllability and, therefore, it has always been desired to have a tight and frictionless controlled sliding valve. The hydraulic valve with sealing rings is not in use to-day, because its known embodiments yield unacceptable friction forces. One essential, though scarcely noticed disadvantage with the gap-sealed sliding valve is that the problem of reducing the leakage and slide friction so entirely dominates the stuctural design, that substantially no freedom of design is left any more. The result are bulky, heavy and expensive valves which, besides, are neither tight nor can be controlled by small forces. The aforementioned disadvantages and problems also exist with piston pumps, because also they operate with gap sealing. Also swivel structures can be pointed out, where gap sealing is required to permit rotary mobility while an axial position is to be maintained by a hydraulic pressure, which must not escape out through the gap sealing.

The present invention has the object to eliminate the aforesaid and other known disadvantages by permitting a certain small leakage past the sealing surfaces and by utilizing the hydraulic conditions then prevailing for eliminating friction. The characterizing features of the invention are that the ring has small cross-sectional dimensions in relation to the spindle and surrounding cavity. that the ring is so slim that the dimensioning fluid pressure over the ring is capable to change the diameter of the ring, but that the ring is of such rigid material that the deformation of the cross-section of the ring is negligible along with the change in diameter of the ring, that the sealing surface of the ring is slightly conic and provided with at least one overall groove, that the ring is located so that the sealing surface at co-operation with either sealing surface of the cavity and spindle forms a gap which has decreasing height ($>0$) in the direction to that side of the ring, against which sealing is to be effected, i.e. in the flow direction of the leakage, that the co-operating sealing surfaces have a surface profile so fine that the total of their profile depth is smaller than the smallest distance of said gap at high pressure, that the ring on said lastmentioned side abuts the radial inner surface of the groove along a supporting surface, which is annular and has a substantially lower height than the cross-sectional height of the ring, and which is located adjacent the sealing surface, so that the ring can be twisted out of its centre plane, and that said supporting surface has such a small height dimension in relation to the axial dimension of the ring, that the friction force in the supporting surface can be overcome by forces acting radially on the ring.

The advantages achieved with the invention are as follows.

(a) The leakage is very small and only slightly depending on the pressure (b) the friction is substantially zero, owing to that contact between ring and slide cannot occur (c) the valve housing can be designed relatively freely, i.e. configuration and material and spindle diameter can be chosen freely and advantageously great. The dimensioning can be made in principle in respect of strength and not prejudiced in view of deformations and thermal expandion.

The advantages resulting therefrom are (d) great structural design freedom and flexibility to meet most desires (e) "small leakage" yields lower costs due to less expensive sliding valve and elimination of the demand of extra valves for the sealing function (f) "low friction" yields improved control capacity and the possibility at valves of direct control instead of by servo assistance or by direct-acting electromagnet without hydraulic servo assistance.

Figure 2:
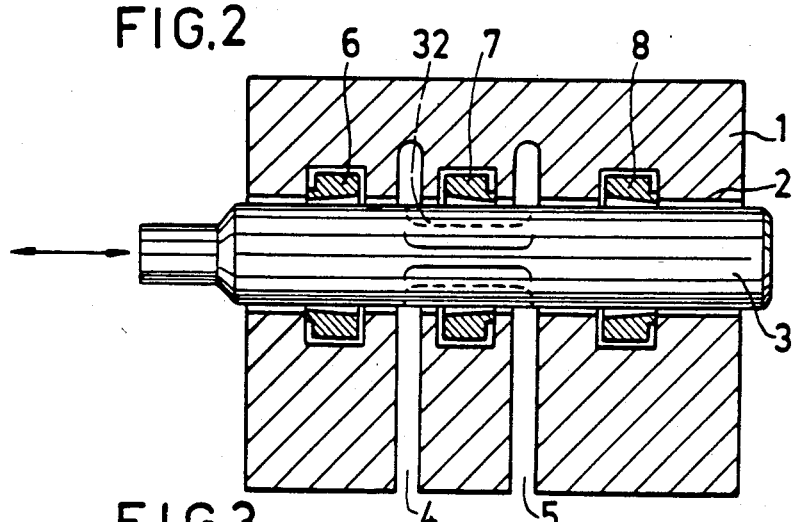
Figure 3:
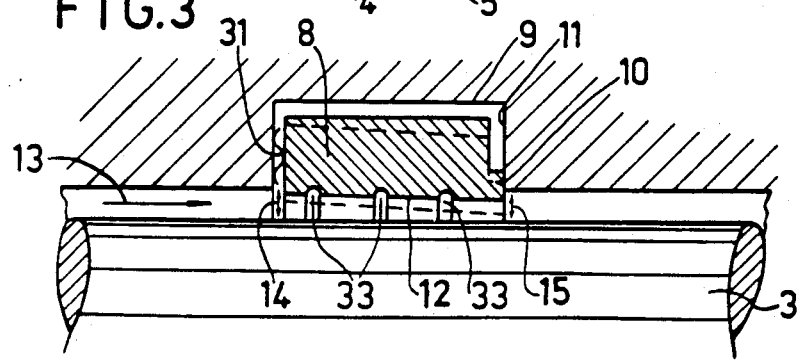
Figure 4:
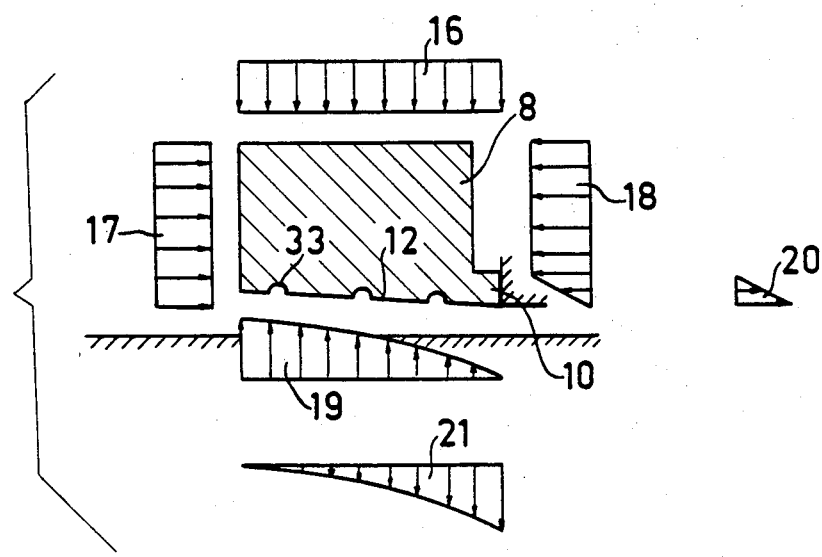
Figure 5:
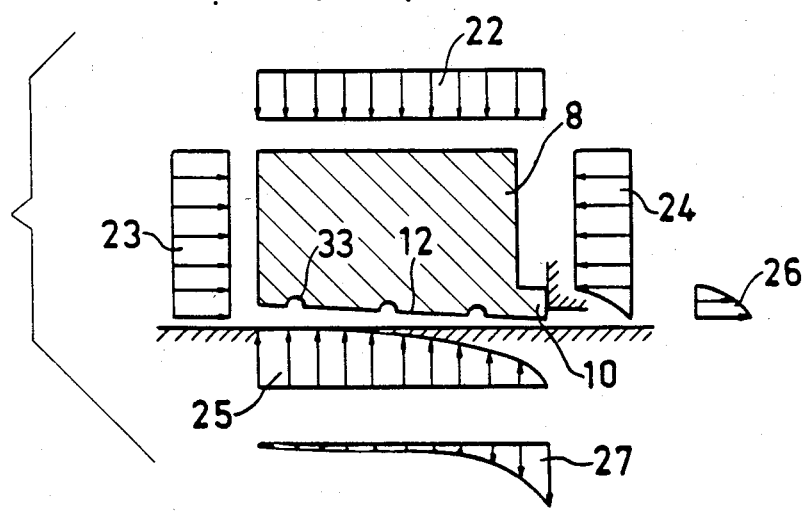
Figure 6A:
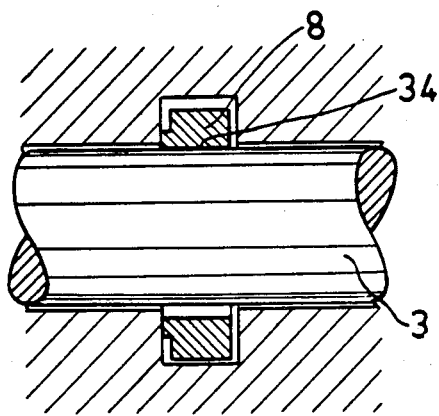
Figure 6B:
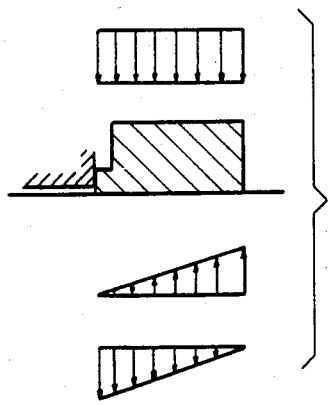
Figure 7A:
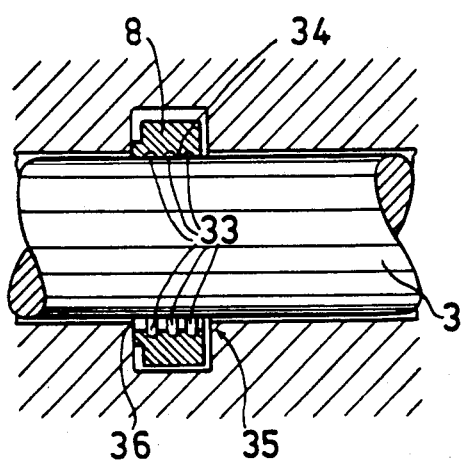
Figure 7B:
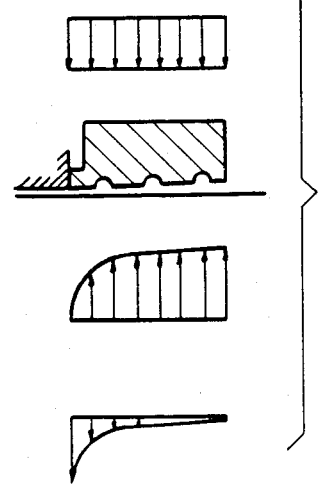
Figure 8:
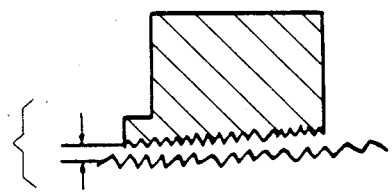
Figure 9:
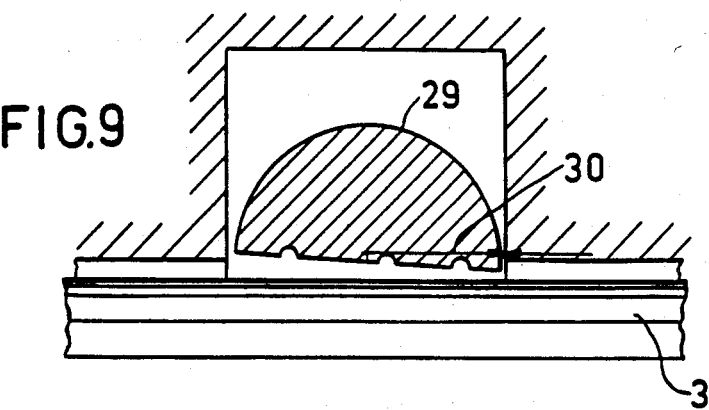
Figure 10:
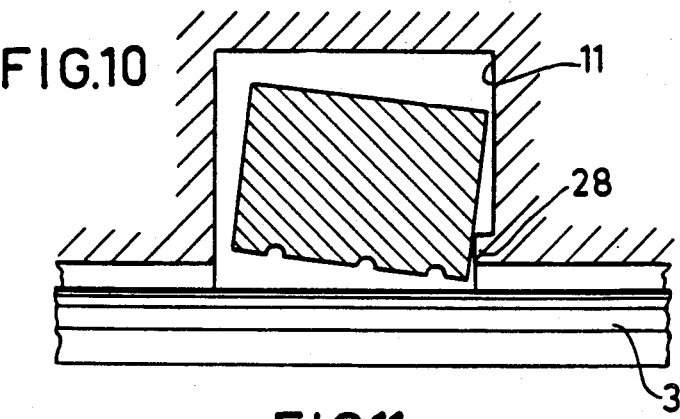
Figure 11:
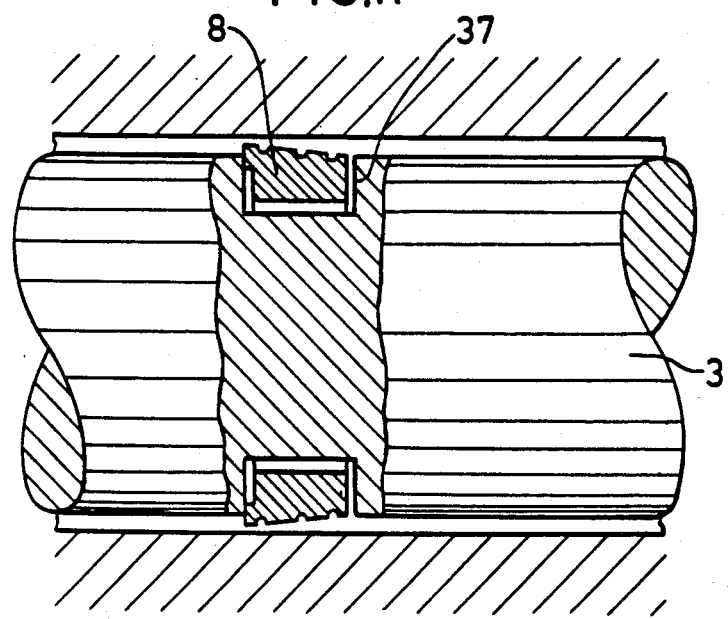

Some embodiments of the invention are described in the following, with reference to the accompanying drawings, in which FIG. 1 is a diagram of the flow leakage as a function of pressure, FIG. 2 shows in a very simplified manner utilization of the invention idea in a control valve, FIG. 3 shows on an enlarged scale the valve sealing according to the first embodiment, FIG. 4 shows schematically the pressure conditions over the valve device in one phase of the sealing process, FIG. 5 shows in the same way the pressure conditions in another phase, FIGS. 6a and 6b show schematically why a sealing ring jams about a spindle, FIGS. 7a and 7b show schematically how the jamming is eliminated by grooves in the sealing surface of the ring, FIG. 8 illustrates the relation between the surface roughness and the size of the gap, FIG. 9 shows on an enlarged scale and substantially simplified a second embodiment of the invention, which also applies to what is shown in FIG. 10, FIG. 11 shows a last embodiment of the invention.

FIG. 1 is a diagram of the flow leakage as a function of the pressure at the sealing gap. The curve A shows the process at constant viscosity and constant clearance. The curve B shows the process when regard is paid also to viscosity reduction due to released heat. The curve C shows the process when in addition to the aforesaid conditions regard is paid also to deformation of the valve housing (the slide is not deformed). The curve D shows the process at a sealing device according to the invention, from which appears that after a short ascent at the beginning the curve rapidly is flattened out so that the leakage remains substantially constant with increasing pressure. This effect was not achieved and is kno known previously.

FIG. 2 shows a valve housing 1, which includes an axial hole 2, in which a spindle 3 can reciprocate. The spindle controls the flow from an inlet passageway 4 past a constriction of the spindle and out through a discharge passageway 5. It is, thus, presupposed that the higher pressure prevails in the inlet passageway 4, and that the same pressure prevails in the discharge passageway 5 when the spindle opens the connection between the passageways. The sealing device is intended to seal outward out of the valve housing and between the passageways 4 and 5 when the inlet passageway 4 shall be closed relative to the discharge passageway 5. Three sealing rings 6, 7 and 8, therefore, are provided, of which the sealing ring 6 seals outward to the left past the spindle 3, and the sealing ring 7 seals to the right from the inlet passageway 4 to the discharge passageway 5 when the spindle 3 is in its outermost left-hand position (not shown). The sealing ring 7 in the position shown rests with the inner surface against bars 32, which are extensions of the sealing surface (shell surface) of the spindle. The pressure connection between the passageways 4 and 5, thus, is formed of axial grooves between the bars. The sealing ring 8 seals outward to the right, i.e. out of the valve housing 1, It is to be noticed, thus, that the sealing rings can perform only one sealing function in one direction, as is apparent from the following description.

FIG. 3 shows the structural design of the sealing ring. The sealing rings 6, 7 and 8 according to FIG. 2 are designed identically and act in the same manner. In the following, for reason of simplicity, the function only of the sealing ring 8 is described. The ring 8 is located in an annular groove 9. In FIG. 3 the ring 8 is shown by way of a cross-section, which in principle is rectangular, but on the right-hand end surface of the ring an annular projecting shoulder 10 is located, and the ring rests with this shoulder against the inner surface 11 of the groove 9. A mechanical force in the form of an annular leaf spring 31 can press the shoulder 10 against the inner surface 11 in order to bring about sealing therebetween before the hydraulic pressure is brought to bear. The shoulder 10, as can be seen, is located at the inner surface 12 of the ring. The height of the shoulder 10, i.e. its dimension in radial direction, is small, and the width of the ring, i.e. its axial dimension along the inner surface 12, preferably is four to twelve times greater than the radial height of the shoulder. The radial height of the ring is small even at large spindles, and a practical dimension can be from 0.5 mm up to 5 mm. The width of the ring can be 1-5 mm. The ring, thus, is small in respect of dimension, and it is also made of an elastic material, for example steel, so as to be slim. It is affected by the hydraulic forces prevailing about the ring, for example by the fluidum flowing between the slide and ring. As appears from FIG. 3, the ring is so located in the groove 9 that there is clearance for the ring to move in the groove 9 in all directions, although in FIG. 3 the ring is shown abutting to the right in the groove, i.e. the shoulder 10 resting against the inner surface 11 of the groove. The fluidum pressure acts on all sides of the ring, except where the shoulder 10 abuts the inner surface 11. The fluidum past the spindle and sealing ring is assumed to flow in the direction of the arrow 13. The sealing ring actually cannot effect sealing against a flow direction other than that shown by the arrow. On the left-hand side of the ring 8 then prevails a certain pressure, while the pressure on the other side of the ring is small. As appears from FIG. 3, the inner surface or sealing surface of the ring is conic in relation to the axial direction. The conicity is very small. This implies that the ring 8 is applied in the annular groove 9. An annular gap is formed against the spindle 3 where the gap height to the left, i.e. at the inlet of the fluidum to the gap, is greater than at the outlet, i.e. on the right-hand side of the ring. The gap height on the left-hand side is designated by 14, and on the right-hand side, i.e. discharge side, by 15. In the following, the pressure to the left of the ring 8 is presupposed to be of a certain size, while the pressure to the right is zero. It can also be shown that the pressure per length unit at flow in a gap agrees with the formula $\Delta P/l = Q\text{ constant}/h^3$, where h is the gap height, l is the gap length and Q is the flow.

In the inner surface 12 (sealing surface) of the ring 8 overall peripheral grooves 33 are located which balance the ring and maintain it free from the spindle 3, as will be set forth further below in the description with reference to FIGS. 6a–7b.

Due to the pressure distribution over the ring, which will be dealt with in greater detail in the following, the pressure on the ring is different on the different sides. As already mentioned, the ring is relatively slim, and the pressure is capable to slightly deform the ring so that it is compressed and assumes the position indicated by dashed lines in the Figure. The right-hand side of the ring thereby is depressed more than the left-hand side, i.e. the gap is changed and has a lower height in the right-hand side end, i.e. discharge end for the fluidum, than in the inlet end. The gap heights 14 and 15, thus, are changed, which also implies that the ring is turned slightly, i.e. twisted to the right in FIG. 3. The form and position of the ring are indicated by fully drawn lines, before the pressure has compressed the ring and changed its form, while in FIG. 3 by dashed lines the position and twisting of the ring are shown after it was compressed due to the pressure conditions.

In FIG. 4 the pressure distribution over the ring is shown before the ring was compressed and twisted. The ring is indicated schematically by 8. 16 illustrates the pressure distribution over the upper surface of the ring, 17 shows the pressure distribution on the left-hand side of the ring, and 18 shows the pressure distribution on the right-hand side of the ring. 19 shows the pressure distribution on the inner surface 12 of the ring. 20 shows the resulting pressure distribution in axial direction. 21 shows in the same way the resulting pressure distribution in radial direction. It appears thereof, that the resulting radial force according to the force distribution 21 compresses the ring radially at the same time as it turns the ring so that the conicity of the gap increases. The resulting radial force according to the force distribution 20 presses the ring axially to the right so that contact is established at the contact surface of the shoulder 10 against the inner surface 11 of the groove (see FIG. 3). The contact force, however, is so small that the resulting friction forces between the shoulder 10 and the inner surface 11 easily can be overcome by the radial forces, whereby the ring becomes self-centering in the groove. The radial forces consist partially of the hydraulic forces according to the force distribution 21 and partially of the spring force of the ring in radial direction.

In FIG. 5 is shown how the pressure distribution against the ring develops after the ring has been compressed by the radial forces. In the same way as shown before, 22 indicates the pressure distribution over the outer surface or upper surface of the ring, and 23 and 24 show the pressure distribution over the left-hand and, respectively, right-hand side of the ring. 25 indicates the pressure distribution over the inner surface 12 of the ring. 26 designates the axial resulting force distribution. It appears thereof, in comparison to FIG. 4, that the axial force, which is low, increases slightly when the ring is turned and decreases to a smaller clearance, i.e. gap height. The height for the shoulder 10 is made so small, that the radial force substantially being equal to the spring force in the ring easily can move the ring in radial direction.

27 shows the resulting radial force distribution on the ring. It can be seen that the resulting force decreases when the clearance, i.e. gap height, decreases, and the resulting force should be zero when the clearance, i.e. gap height, should be zero. The clearance between the ring and spindle, i.e. the gap height, thus decreases to a small value where the spring tension in the ring from its compression and the resulting radial force balance each other. The dimensioning, thus, for the ring is such that the ring never is permitted to mechanically abut the sealing surface of the spindle. As an example can be mentioned that practical dimensions for the gap at its centre can be 2–5μ while the gap at the inlet can exceed the gap outlet by 1–2μ.

The demand of one or more overall so-called balancing grooves 33 is explained in that the sealing ring is so weak and pressure-sensitive that it can be locked with a very high locking force in connection with pressure increase from zero pressure, and that this occurs before a conic sealing gap can develop about all of the periphery between the sealing surfaces.

The locking phenomenon occurs when a sealing ring without balancing grooves abuts the slide 3 somewhere on the circumference of the slide, and when it does so with its entire sealing length. See at 34 in FIG. 6a. As shown in FIG. 6b, a linear decreasing pressure then is formed between the sealing ring and slide. As the pressure acting on the outer surface of the sealing ring 8 is constant, the resulting pressure acting locally on the ring has a triangular distribution and a mean pressure, which corresponds to half the pressure on the pressure side of the ring. Due to the weakness of the ring in relation to the pressure applied, the ring is pressed against the slide 3 without clearance locally in places where the ring at the beginning of pressure increase was in contact, and this pressing of the ring against the slide spreads from the starting position to an overall contact, which cannot be abolished unless the pressure again has achieved a very low value. The locking force thus formed prior to the formation of a conic gap is very high for the type of sealings which relative to the pressure are very weak, to which sealings the present invention relates, which sealing, therefore, cannot be used at all.

Examples of such sealing structures and rings where this fact of locking has not been observed, are described, for example, in DE OS No. 1 475 588. The teaching in this publication, therefore, is entirely insufficient in respect of a slim sealing ring design, which is intended to withstand high pressures for a hydraulic flow without the risk of locking between the ring and co-operating sealing surface.

When the very weak sealing ring 3 relative to the pressure is conic and, besides, provided with one or more balancing grooves 33, this initial locking cannot take place. See FIG. 7a. The pressure in a contact point 34 between the slide 3 and sealing ring 8 now has a linear distribution in the manner as arising without balancing grooves, in that the conic sealing ring on the opposite side, at 35, to the contact acts via the balancing grooves 33 on the surface with a pressure, which is close to the pressure applied to the outer surface of the sealing ring. See FIG. 7b. No locking, therefore, occurs at pressure increase from zero, but the ring starts decreasing its clearance at its smallest diameter, at 36, whereby a centering force acts on the ring, so that an overall gap is formed which now has increasing conicity. It is, thus, impossible to achieve locked leakage and low friction and freedom against locking against the slide by means of the sealing ring when this is weak relative to the pressure, if the ring lacks balancing grooves 33 or initial conicity and, besides, does not have a supporting surface, which is so small that the friction forces acting there in radial direction are not smaller than the centering forces originating from the sealing gap and acting on the ring.

As the present invention relates to a sealing ring, which is very weak relative to the pressure, this ring is compressed already at a low pressure and forms a sealing surface, which is increasingly conic from the initial sealing surface and which has its smallest clearance at the supporting surface against the sealed pressure side. At the present invention, this clearance is so small that it is of the same magnitude as the profile depth for ground surfaces. Especially at the highest pressures applied, the clearance is so small that great demands are to be made on the profile depth of the opposed sealing surface in order to prevent that they engage with each other and, thus, the sealed medium can flow only in the gap formed between the lowest valleys and highest crests of the respective surface profile. See FIG. 8. The gap height $h_{min}$ formed from a flow-technical aspect, thus, must, expressed in simple terms, be greater than the total of the profile depths of the co-operating sealing surfaces. The surface certainly to some extent is filled up by the medium, which often chemically combines with the sealing surfaces, for example gets soapy in connection with steel surfaces and mineral oil, but it is evident that a good function, i.e. low friction, requires a surface roughness for both sealing surfaces which is lower than the possibly arising annular gap. At practical solutions according to the invention, for example in valves, the minimum clearance is below 1 micrometer, which requires the co-operating sealing surfaces to have a surface roughness with a profile depth of about 0.5 micrometer each for preventing friction.

It is also to be observed at the invention that at the manufacture of the valve body and/or valve spindle and annular groove the angle errors relative to contact surfaces and sealing surfaces must not be so great that the conicity of the ring relative to the co-operating sealing surface is eliminated.

In FIG. 9 a second imaginable embodiment of the invention is shown schematically, which differs from the embodiment described above only in that the outer surface 29 of the ring has been given circular cross-sectional shape, whereby the ring on its right-hand side abuts the groove along a very small annular surface, and the force vector 30 is directed to the circle centre. The ring, thus, will be twisted in the way described previously.

In FIG. 10 a third embodiment is shown which differs in such a manner, that the shoulder is not located on one vertical side of the ring, but the shoulder 28 is located on the inner surface 11 of the groove adjacent the spindle.

In FIG. 11 a fourth embodiment is shown. As it may have been self-understood already previously, the ring 8 instead of being located in an annular groove in the cylindric hole may be located in an annular groove 37 in the spindle 3. The ring behaves in the same way as described above, with the only difference that the outer surface of the ring constitutes a sealing surface instead of, as previously, the inner surface of the ring. The ring also expands at the hydraulic pressure applied instead of being compressed. In this case the connection between the different pressure passageways consists of grooves in the valve housing.

Some embodiments have been described above. Additional embodiments, of course, can be imagined. This applies particularly to the configuration of the ring and, additionally, to the form of the sealing surface. Conclusively can be said that the ring can be designed in very small dimensions relative to the spindle and cylinder bore. It is endeavoured so to adjust the slimness of the ring to the hydraulically acting forces, that the ring maintains a certain minimum distance to the co-operating sealing surface. In this way some kind of a floating sealing ring is obtained, and hydraulic forces are utilized for the sealing forces instead of mechanical forces. There is no risk of locking between the spindle and cylinder bore, and the control forces to be applied on the spindle for the operation are extremely small in relation to what according to prior art can be the case. Compared to conventional sealing rings, the sealing ring seals only in one direction, but this is no disadvantage in the applications for which the sealing ring is intended to be used. The ring thus has a small initial clearance, i.e. zero pressure clearance, which is changed when the pressure drop is laid over the ring so that the clearance is decreased, i.e. the gap height becomes smaller, and thereby less leakage occurs, but without the clearance decreasing to zero. No contact is established between the ring and co-operating sealing surface. The existing conic gap centers the ring to a substantially concentric position in that the pressure drop balance arising at eccentric position yields a higher resulting force in radial direction than the friction force caused by the axial force upon radial movement of the ring.

It also is to be pointed out that the embodiments described above refer to sealing between slide (spindle) and slide bore at a sliding valve. The sealing device according to the invention, however, can be used in many other applications, of which may be mentioned piston pumps and swivels, at which latter mobility exists in the direction of rotation between spindle and cylinder bore.

I claim:

1. A sealing device for sealing in one direction between the co-operating surface of a cylindric cavity and the shell surface of a spindle movable therein, of which surfaces either is provided with an annular groove, in which a sealing ring is located, which has some mobility in axial and radial direction, and which is intended to minimize the fluidum leakage in axial direction between the co-operating surfaces, and the sealing surface of the ring positioned in a groove in the cylindric cavity is located about the inner surface of the ring, and of the ring positioned in a groove in the spindle is located about the outer surface of the ring, characterized in that the ring (8) has small cross-sectional dimensions in relation to the spindle (3) and enclosing cavity (2), that the ring is so slim that dimensioning fluidum pressure over the ring easily is capable to change the diameter of the ring (compression or expansion), but is of such a rigid material that deformation of the cross-section of the ring is negligible relative to the change in diameter of the ring, that the sealing surface (12) of the ring is slightly conic and provided with at least one overall groove (33), that the ring is located so that the sealing surface (12) at co-operation with the sealing surface of either the cavity (2) or spindle (3) forms a gap (14,15), the height (>0) of which decreases in the direction to that side of the ring against which sealing is to take place, i.e. in the flow direction of the leakage, that co-operating sealing surfaces have such a fine surface profile that the total of their profile depths is smaller than the smallest dimension of said gap at high pressure, and that the ring (8) on said lastmentioned side abuts the radial inner surface (11) of the groove along a supporting surface (10), which is annular and has a substantially smaller height than the cross-sectional height of the ring and is located against the sealing surface (12) so that the ring can be twisted out of its central plane, and said supporting surface has such a small height dimension in relation to the axial dimension of the ring, that the friction force in the supporting surfface can be overcome by forces acting radially on the ring.

2. A sealing device as defined in claim 1, characterized in that the annular supporting surface is formed of an annularly projecting shoulder (10) on the side of the ring.

3. A sealing device as defined in claim 1, characterized in that the annular supporting surface is formed of an annularly projecting shoulder (28) on the radial inner surface of the groove.

4. A sealing device as defined in claim 1, characterized in that the ring is pressed by mechanic means against the supporting surface (10).

5. A sealing device as defined in claim 2, characterized in that the section of the sealing ring is formed of an arc (29) and a straight line at the sealing surface, and that the contact is established via the circular surface, the force line (30) directed to the centre of the arc.

6. A sealing device as defined in claim 1, characterized in that the axial dimension of the ring is four to twelve times greater than the height dimension of the supporting surface.

7. A sealing device as defined in claim 1, where the sealing device in a certain position for the spindle shall permit fluidum to pass for control, characterized in that in said position the ring is controlled by axial bars in the extension of the co-operating surface.

8. A sealing device as defined in claim 1, characterized in that the smallest dimension of the gap height is greater than the total of the profile depths of the two co-operating sealing surfaces.

* * * * *